United States Patent [19]

van der Lely

[11] 4,269,427
[45] May 26, 1981

[54] LIFTING DEVICE AND ASSOCIATED STRUCTURE

[76] Inventor: Cornelis van der Lely, 7, Brüschenrain, Zug, Switzerland

[21] Appl. No.: 24,189

[22] Filed: Mar. 27, 1979

Related U.S. Application Data

[62] Division of Ser. No. 788,915, Apr. 19, 1977, Pat. No. 4,194,756.

[30] Foreign Application Priority Data

Apr. 23, 1976 [NL] Netherlands ............ 7604307

[51] Int. Cl.³ .................. A01B 59/043; A01B 59/048
[52] U.S. Cl. ................... 280/446 A; 172/831; 172/445
[58] Field of Search .......... 280/446 A, 446 R, 456 A, 280/460 A, 461 A, 497, 405 R, 405 A, 405 B, 481; 414/694, 703; 172/276, 443, 445, 439; 212/8 A, 8 B

[56] References Cited

U.S. PATENT DOCUMENTS

| 2,597,692 | 5/1952 | Wills et al. ................... 414/703 X |
| 2,623,310 | 12/1952 | Raught ........................ 172/276 |
| 3,299,547 | 1/1967 | Gee et al. .................... 280/405 R |
| 3,957,167 | 5/1976 | Jacobson ...................... 414/703 |

*Primary Examiner*—John A. Pekar
*Attorney, Agent, or Firm*—Penrose L. Albright

[57] ABSTRACT

Removable lifting devices for tractors having horizontal front wheel axles which pivot relative to the contour of the ground, one device having tubes pivotably connected on each side of the tractor frame which rotatably and pivotably receive further tubes connected by a hinged structure to the tractor's forward axle and which tend forwardly thereof to be interconnected across the front of the tractor. The connecting hinged structure permits pivotable movement of the tube relative to the axle about substantially horizontal axes parallel and perpendicular to the longitudinal axis of the tractor. The front structure connecting the tube portions extending forwardly from the axle includes a hydraulically operated three-point lifting device wherein hydraulic cylinders are disposed within a quadrangular arrangement of pivotable arms including the lower of the three-point lifting device's links. A power take-off from the rear of the tractor is connected through a gear transmission and appropriate linkage supported under the tractor, including universal joints, to extend forwardly of the tractor for optional connection to a machine or tool connected to the lifting device. In a further embodiment, the front support for the lifting device is rigidly connected to the front axle on both sides of the tractor. Torque generated by the load of the lifting device is compensated for by hydraulic cylinders which are disposed horizontally to connect the tractor's frame and upward extensions which are rigidly connected to the lifting device's front supporting beam and via same to the front axle. Such extensions are maintained in a relative vertical position by the hydraulic cylinders whereby twisting of the front axle is prevented.

10 Claims, 8 Drawing Figures

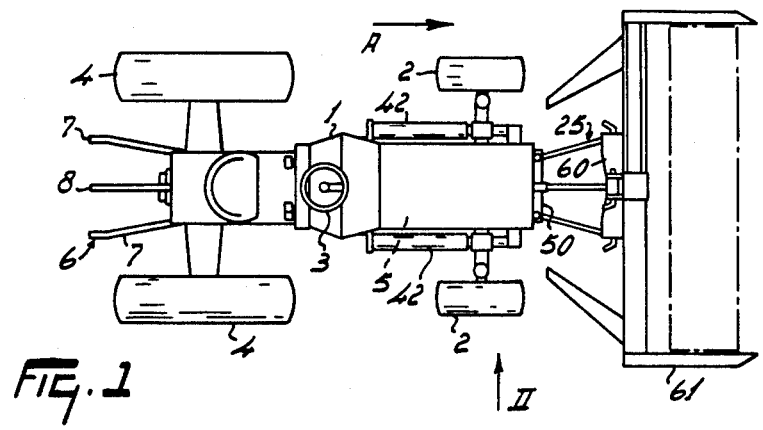
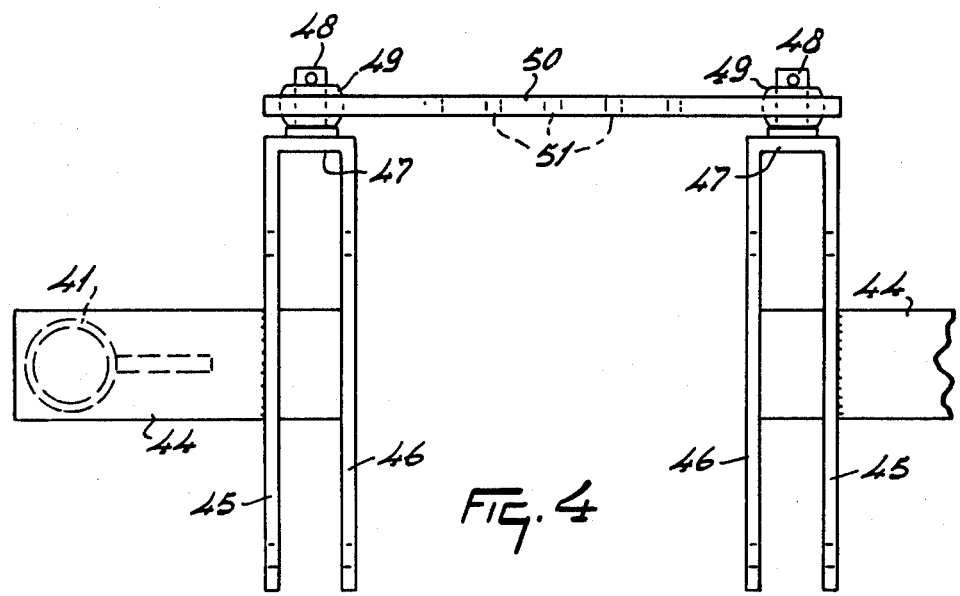
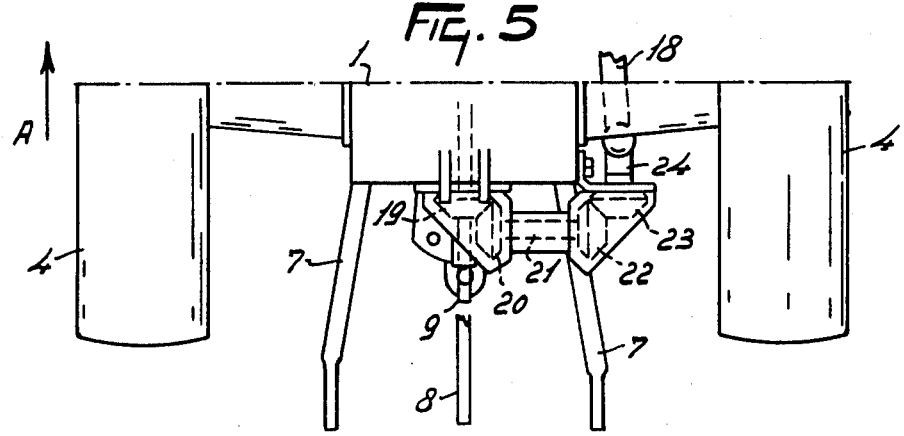

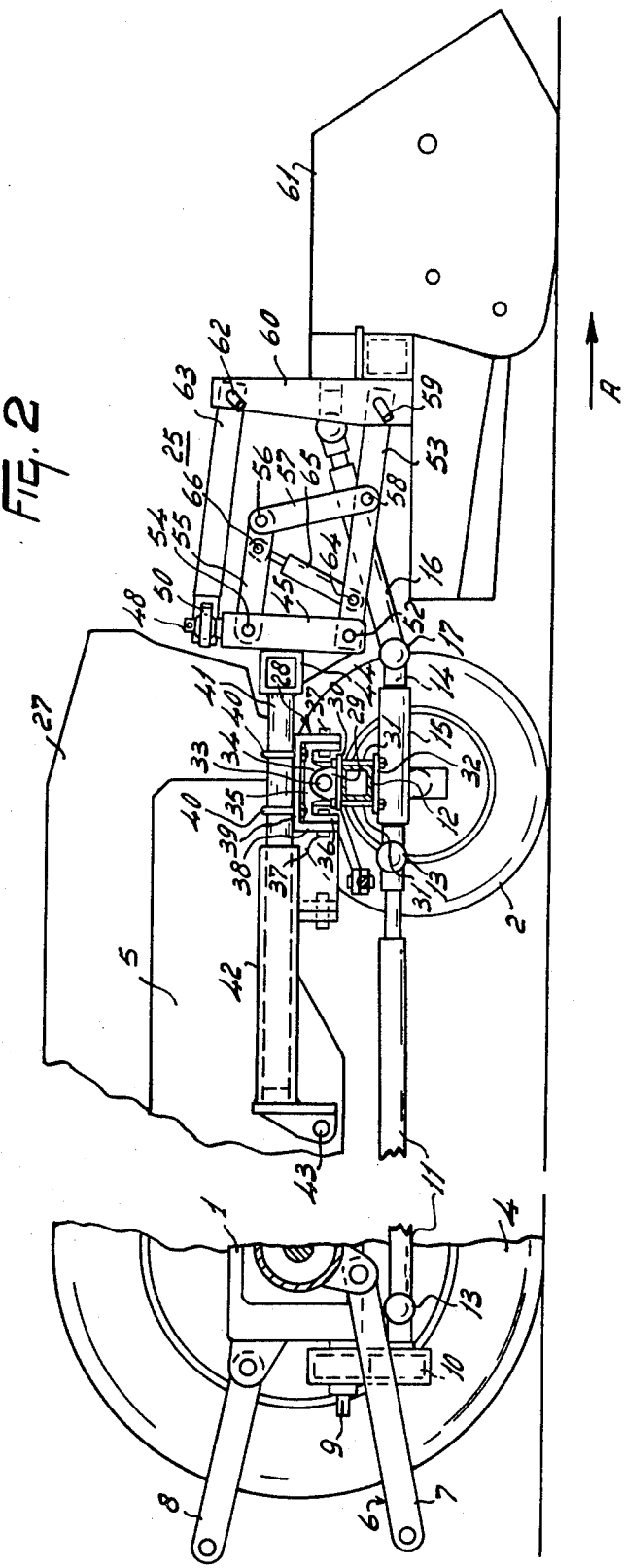

LIFTING DEVICE AND ASSOCIATED STRUCTURE

RELATED APPLICATIONS

This is a division of application Ser. No. 788,915 filed Apr. 19, 1977, now U.S. Pat. No. 4,194,756.

SUMMARY OF THE INVENTION

The invention relates to lifting devices for use on a tractor equipped with hydraulic lifting means.

The adaptation of agricultural machines or tools or the like carried by a lifting device relative to the underlying ground is often determined by the tractor ground wheels which primarily determine or otherwise govern the position of the tractor frame with respect to the horizontal. These are usually the rear wheel in most standard types of tractors. If the lifting device is comparatively remote from such ground wheels, for example, in the case of a lifting device attached to the front of a tractor, the axle of the rear wheels being in a fixed position relative to the tractor frame, the adaptation of the machine or tool to the ground may leave much to be desired.

A primary object of the invention is thus directed to improvement in the capacity of coupled machines or tools to adapt to the underlying ground.

According to the invention, a lifting device is provided with means whereby it is, as a unit, freely pivotable with respect to the tractor frame about a substantially horizontal pivotal axis extending in the direction of movement of the tractor. In this manner the lifting device, and hence the machine attached thereto, follows the contour of the ground generally independently of movements of the tractor frame.

For a better understanding of the invention and to show how the same may be carried into effect, reference will be made by way of example to the accompanying drawings.

BRIEF DESCRIPTION OF THE DRAWINGS

FIG. 1 is a plan view of a tractor having a lifting device in accordance with the invention;

FIG. 2 is a side elevation viewed in the direction of arrow II in FIG. 1;

FIG. 4 is an elevational view taken on lines IV—IV in FIG. 3;

FIG. 5 shows an alternative embodiment of part of the structure shown in FIG. 3;

DESCRIPTION OF THE PREFERRED EMBODIMENTS

Figure 3:
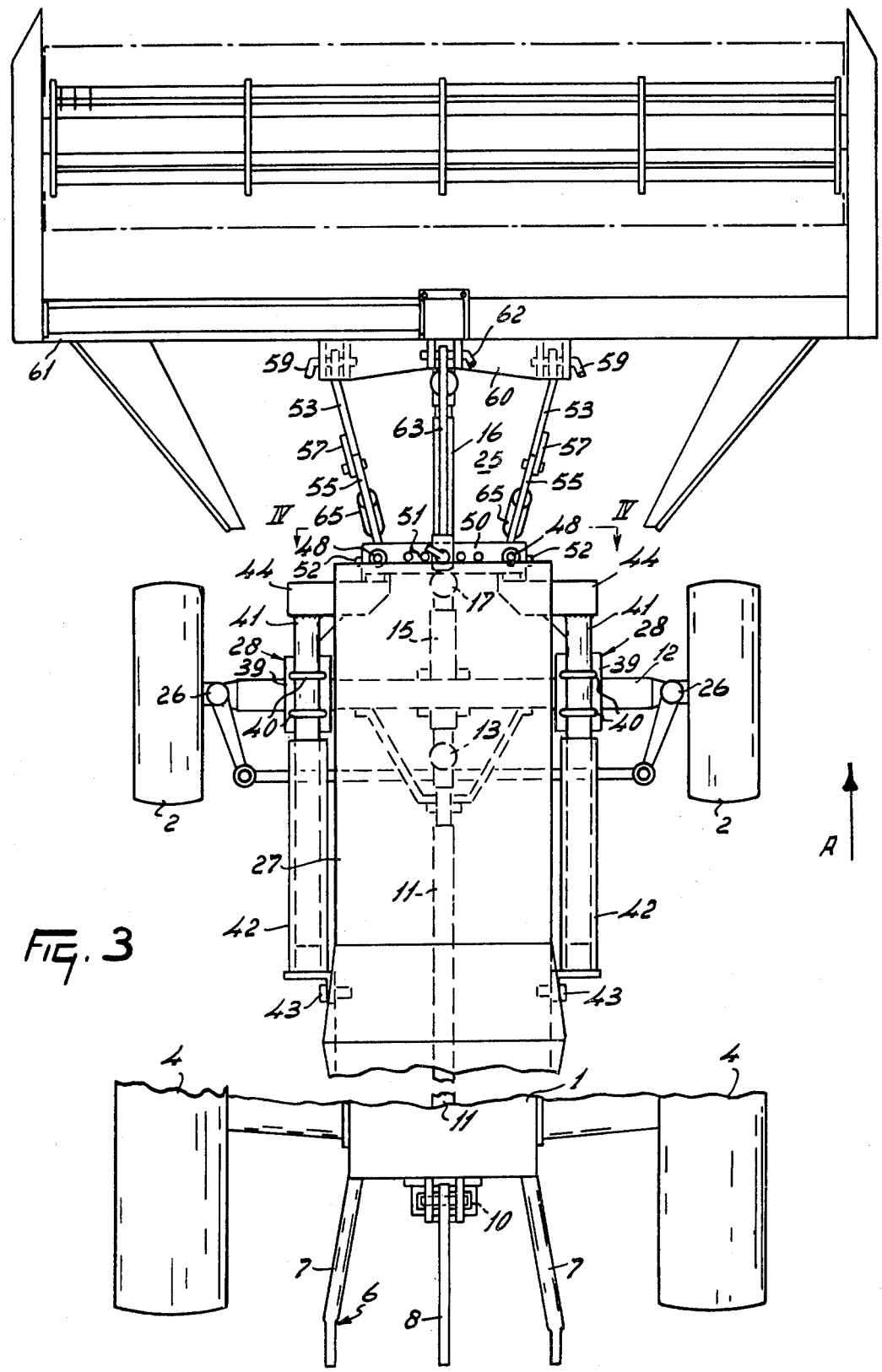
FIG. 3 is a plan view of the structure shown in FIG. 2.

The tractor shown in the Figures comprises a frame 1 supported by steerable forward ground wheels 2, which are controlled by a steering device 3, and by rear wheels 4, which are powered by an engine 5. On the rear side of frame 1, a three-point lifting device 6 of known type comprises two lower lifting arms 7 and an adjustable upper rod 8.

On the rear side, the tractor has a power take-off shaft 9 powered by engine 5, the center line of said shaft being located substantially in the vertical, longitudinal plane of symmetry of the tractor. For the purpose of the intended attachment of tools or machines to the front of the tractor, a gear transmission 10 is provided, which may have two relatively engaging gears, one of which is mounted on power take-off shaft 9, the other gear being located beneath the power take-off shaft so that the output shaft of transmission 10 is located under frame 1 and extends forwardly viewed in the direction of movement A. With this forwardly extending output shaft of transmission 10 is connected an auxiliary shaft 11 which is supported not only by the housing of transmission 10 but also by the lower side of a front axle 12 of the tractor which is in the form of a hollow beam. Auxiliary shaft 11 is, for this purpose, in the form of a telescopic shaft and provided with one or preferably two universal joints 13, the foremost being coupled with a shaft 14 journalled in a sleeve 15, which is rigidly secured to the bottom of front axle 12 so that the center line of sleeve 15 is located substantially horizontally within the vertical, longitudinal plane of symmetry of the tractor. Connected to the forward end of shaft 14 via a universal joint 17 is a driving shaft 16 which, in the same manner as front power take-off shaft, is capable of driving an agricultural machine or tool mounted on the front of the tractor in a manner subsequently to be described more fully. (FIGS. 2,3).

FIG. 5 shows an alternative structure for providing a power take-off shaft at the forward end of the tractor, the space under rear power take-off shaft 9 being free for other purposes. This is accomplished by extending the driving gear of a forwardly extending auxiliary shaft 18 in a horizontal and lateral direction towards one of the rear wheels 4. To this end, power take-off shaft 9, forming part of the tractor's standard equipment, is provided with a bevel gear 19 which meshes with a further bevel gear 20, mounted on a shaft 21 which is journalled in the transmission housing and has its center line extending horizontally and transversely relative to the direction of movement A. At the end remote from the gear 20, shaft 21 is provided with another bevel gear 22, which is in mesh with a still further bevel gear 23 affixed to an output shaft 24. Shaft 24 is journalled in the transmission housing; its center line extends horizontally in a direction parallel to the direction of movement A. Shaft 24, upon emerging forwardly out of the transmission housing is coupled by means of a universal joint with an auxiliary shaft 18. Thereafter auxiliary shaft 18 is interconnected with shaft 14 in the manner previously described for shaft 11. Bevel gear 23 is located near the inner side of one of rear wheels 4. Parts 10 to 24 may be mounted as accessory components on standard type tractors. The forward and after power take-off shafts being connected without an intervening clutch or the like are started and stopped together.

A forward lifting device generally designated by reference numeral 25 is fastened at the front of the tractor. Front axle 12, formed by a hollow square-section beam, is freely pivotable with respect to tractor frame 1 in known manner about a substantially horizontal pivotal axis (not shown) extending in the direction of movement A and contained in the vertical, longitudinal plane of symmetry of the tractor, the pivotal shaft being fastened to the bottom side of frame 1. This construction is typical of standard types of tractors which are generally mass produced. When travelling on a curve, front axle 12 remains at right angles to the vertical, longitudinal plane of symmetry of the tractor, whereas in known manner front wheels 2 are turned via steering device 3 about upwardly extending pivotal shafts 26 which are fastened to the ends of front axle 12.

On either side of the external boundaries of a sheet metal casing 27 covering engine 5, a hinge structure 28 is releasably arranged on the top side of front axle 12. Structure 28 comprises a plate-shaped ear 29 extending at right angles to the direction of length of front axle 12 and being welded to a supporting plate 30 arranged on the top side of, and secured to, front axle 12 by means of bolts 31 on the front and rear sides of front axle 12 and by means of an appropriate clamping plate 32. Ear 29 is provided with a hole receiving a pivotal shaft 33, the center line of which, viewed in plan, is normal to the longitudinal plane of symmetry of the tractor and is invariably parallel to the center line of front axle 12. A further ear 34 is freely pivotable about pivotal shaft 33. A supporting structure 35, in the form of an inverted U, is affixed to ear 34. The limbs 36 of the supporting structure, located one on each side of pivotal shaft 33, extend downwardly and each carries a pivotal shaft 37, the center lines of each said shaft being aligned with each other and being substantially horizontal and parallel to the longitudinal plane of symmetry of the tractor. The coinciding center lines of pivotal shafts 37 intersect the center line of the pivotal shaft 33. Limbs 38 of a U-shaped supporting member 39 are freely rotatable about the pivotal shafts 37. The web of a supporting member 39 is rigidly secured by means of two clamping brackets 40 to a supporting beam 41, which, viewed in plan, extends substantially parallel to the vertical, longitudinal plane of symmetry of the tractor and is formed by a hollow, cylindrical tube. Tubular supporting beam 41 extends from hinge structure 28 both rearwardly and forwardly. The portion of supporting beam 41 extending to the rear away from the clamping brackets 40 is located in a hollow, cylindrical tubular beam or support 42 which slideably and rotatably receives supporting beam 41 and is provided at the rear with a horizontal pivot pin 43 which extends transversely of the direction of movement A and is freely pivotable in an opening therefor in the side of the tractor which connects to frame 1. Such openings are generally already provided in standard types of tractors at the factory and may be located, viewed in plan, approximately midway between front axle 12 and the bearing axle of rear wheels 4.

Supporting beam 41 is prolonged forward of clamping brackets 40 and has welded to its end a hollow beam 44 of rectangular or square cross-section, the center line of which is, viewed in plan, substantially at right angles to the vertical, longitudinal plane of symmetry of the tractor. In a direction transverse to such longitudinal plane of symmetry the inboard end of beam 44 is located approximately midway between said plane and the outboard boundary of supporting beam 41, (see also FIG. 4).

The construction described comprising components 28 to 44 is arranged in mirrored fashion on the other side of the tractor. Near the inboard ends, two hollow beams 44 are each provided with two plate-shaped fastening strips 45 and 46, welded to the forward sides of the beams 44. In FIG. 4, strips 45 and 46 which are shown disposed substantially vertically on beams 44 at right angles to the direction of length thereof project relative to the bottom side and the top side of beam 44; they are spaced apart and are interconnected at their upper ends by means of a coupling plate 47. Each coupling plate 47 has fastened thereto a pin 48. The center lines of pins 48 are located approximately in a vertical plane at right angles to the longitudinal plane of symmetry of the tractor. Further, each of the two pins 48 is surrounded by a ball-and-socket joint 49. A coupling piece formed by a coupling plate 50 is omnidirectionally pivotable about the two ball-and-socket joints 49. Coupling plate 50 has a plurality of fastening holes 51 and is normally disposed substantially parallel to a horizontal plane. Coupling plate 50 may, if desired, be fastened by means of pivotal shafts to the two coupling strips 47, the center lines of which are parallel to the center lines of the associated supporting beams 41.

Each set of fastening strips 45 and 46 has aligned holes near the lower side for receiving a pivotal shaft 52, about which a lower lifting arm 53 of lifting device 25 may turn, a said lifting arm 53 being located between the two strips 45 and 46 of each set. Near the top side each set of strips 45 and 46, further aligned holes are provided for receiving a pivotal shaft 54, by means of which each of a pair of arms 55, located individually between the strips 45 and 46 of each set, is received. The forward end of each of arms 55 is pivoted by means of a pivotal shaft 56 to a corresponding arm 57. The ends of the two arms 57, remote from the pivotal shaft 56, are each pivoted by means of a pivotal shaft 58 to a lower lifting arm 53. Each pivotal shaft 58 is received approximately midway along the length of its corresponding lifting arm 53. Near their ends, the two lower lifting arms 53 are each provided with a hole for receiving a locking pin 59 to fasten a trestle 60 having, for example, the shape of an inverted V. Trestle 60 is associated with an appropriate machine or tool 61 which is illustrated as mounted on lifting device 25. The upper side of trestle 60 is approximately in the vertical, longitudinal plane of symmetry of the tractor and is secured by means of a locking pin 62 to the forward end of an upper rod 63 associated with lifting device 25, the after end of said rod being adapted for connection to coupling plate 50 by, for example, means of a pin inserted into one of its holes 51. Adjacent and forward of its corresponding pivotal shaft 52, each of the two lower lifting arms 53 is provided with a bore for receiving a pivotal shaft 64, by means of which a hydraulic lifting cylinder 65 is pivotally secured to lifting arm 53. The piston rod of hydraulic lifting cylinder 65 is pivoted by means of a pivotal shaft 66 in a further bore in arm 55 located adjacent and to the rear of pivotal shaft 56. Hydraulic cylinder 65 is connected with the hydraulic system of the tractor and is actuated from the driver's seat. The machine or tool 61 is optionally powered by means of driving shaft 16, which is rotated via auxiliary shaft 11 via the gear transmission shown in FIG. 2 or, alternatively, via the gear transmission shown in FIG. 5.

The operation of the mechanism described above will now be described. Standard type tractors which are mass produced are usually equipped from the factory with front axle 12, as described above, which is freely pivotable about a horizontal pivotal axis located in the vertical, longitudinal plane of symmetry of the tractor, and are also factory equipped with a lifting device 6, arranged at the rear end of the tractor. Machines or tools attached to the lifting device 6, of types which bear on the ground, are generally capable of following uneven contour of the ground in a satisfactory fashion. The lifting device itself is rigidly maintained with respect to the supporting structure of rear wheels 4 so that vertical movements of wheels 4 are transferred, via the lifting device, to the hitched tool, while at the same time the lifting device may, in general, provide a certain amount of play and is therefore capable of freely moving vertically to a certain extent when the machine bears on the ground.

Standard type tractors are usually not provided with a forward lifting device and thus are not generally intended for the employment of machines or tools having a construction or designed for operations requiring their attachment at the front of a tractor.

However, even if a lifting device is mounted at the front of a tractor frame (as is common practice at the rear), a serious problem arises in that machines or tools mounted at the tractor's front are still largely governed by movements of the tractor frame produced by rear wheels 4. This is because front axle 12 is freely pivotable with respect to the tractor frame. The machine or tool coupled with a lifting device mounted at the tractor's front thus follows, in fact, movements produced in the frame due to contour of the ground occurring at the rear wheels, a comparatively long distance behind the machine or the tool, so the correlation of the movements to the ground surface in front of the tractor is poor.

In the embodiment described, the machine or tool mounted at the front of the tractor, however, is governed by movements of the front axle and forward lifting device 25 thus is freely movable within limits rather than comparatively rigid relative to the tractor frame. When front axle 12 tilts as a result of irregularities in the ground's contour with respect to tractor frame 1 about said horizontal pivotal shaft extending in the direction of movement A, the front axle occupies an inclined position relative to a horizontal plane perpendicular to the vertical, longitudinal plane of symmetry of the tractor frame and hence supporting beams 41 and supports 42 on either side of the tractor frame are also inclined at different angles relative to such horizontal frame. This relative twist is made possible by pivotal shafts 37, supporting member 39 being capable of turning about such shafts with respect to front axle 12. Apart from this degree of freedom, the front axle is also capable of upwardly movement out from its central position on one side of the tractor frame, whereas it moves downwards on the other side so that the two combinations of supporting beam 41 and support 42 in the vicinity of the front axle also move upwards and downwards respectively, which movements are permitted by the pivotability of said combinations about pivotal pins 43. However, inasmuch as pivotal pins 43 are rigidly secured with respect to the tractor frame, an angular turn is produced, viewed in elevation, between the combinations of beam 41 and support 42 on the one hand and the front axle 12 on the other. This turn or twist causes opposite arcuate movements about pivotal shafts 33 of the two hinge structures 28. The two foremost ends of supporting beams 41 and hollow beams 44 rigidly secured to the former are also relatively movable in a vertical sense and perform a relative turn. The latter relative turning movement of the two supporting beams 41, the two hollow beams 44 and the two sets of fastening strips 45 and 46 is required because of their connections through coupling plate 50 which connects the two ends of the latter sets by ball-and-sockets 49. Lifting device 25, mounted on the two sets of fastening strips 45 and 46 and on the coupling plate 50, therefore, turns together with front axle 12 with respect to the tractor frame 1.

When the two coupled hydraulic cylinders 65 are actuated by the tractor driver via the hydraulic system of the tractor, the quadrangles located on either side, the corners being formed by the center lines of pivotal shafts 52, 54, 56 and 58 are biased so that lower lifting arms 53 are moved vertically in the direction desired while machine or tool 61, mounted by means of trestle 60, which is connected by upper rod 63 to coupling plate 50, is also displaced vertically. When machine 61 bears on the ground, with the spaces within the cylinders 65 on either side of the pistons shortcircuited, the lower lifting arms 53 may move freely up and down relative to each other.

It should be noted that a further adaptability is obtained inasmuch as each supporting beam 41 may rotate within its associated support 42.

The weight of lifting device 25 and of a mounted machine or tool 61 is thus transferred by means of a frame of lifting device 25 formed by supporting beams 41, supports 42 and hollow beams 44 via hinge structure 28 directly to front axle 12 and hence to front wheels 2, and on the other hand via pivotal pins 43, located behind front axle 12, to frame 1 of the tractor. Hence the weight is not concentrated in one place such as the front; rather it is distributed while at the same time machine 61 following the vertical movements of front wheels 2 independently of like movements by the tractor frame. If desired, to minimize bending stress on the front wheel axles, hinge structures 28 may be mounted near the ends of front axle 12, that is to say near pivotal shafts 26. It will be understood that the frame of lifting device 25 while turning about pins 43 moves freely withinlimits relative to frame 1 and engine casing 27. Inasmuch as supporting beams 41 are displaceable in an axial direction in their associated supports 42, the frame of lifting device 25 is adaptable to the particular dimensions of various sizes of tractors. This applies not only to standard type tractors, but also to many special purpose tractors because of the utility of construction embodying the invention for general employment. Lifting device 25, together with its frame, is arranged whereby it can be installed or removed without undue difficulty on a tractor, inasmuch as only pivotal pins 43 and bolts 31 need be tightened or loosened for these purposes.

Figure 6:
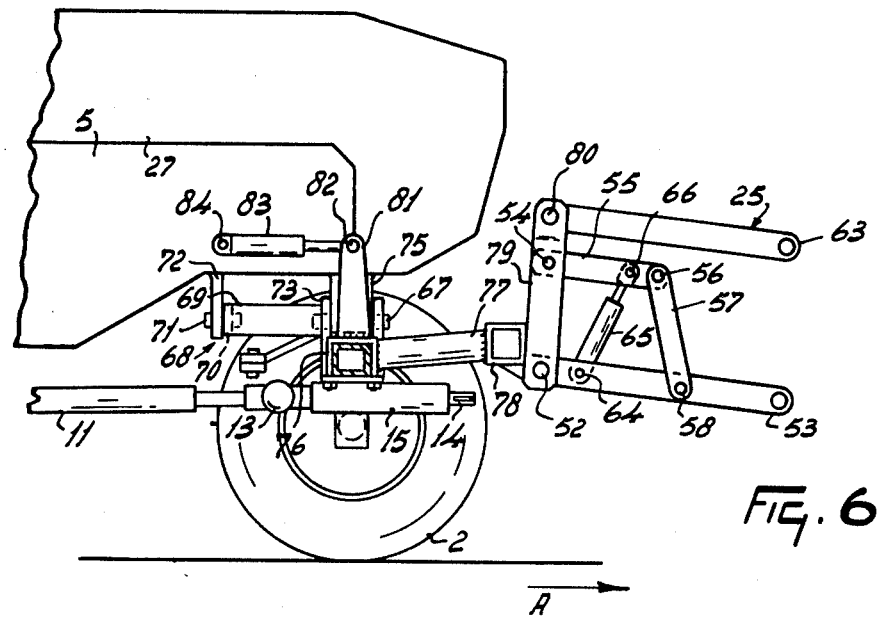
FIG. 6 shows a second embodiment of the structure viewed in the direction of arrow II in FIG. 1.
Figure 7:
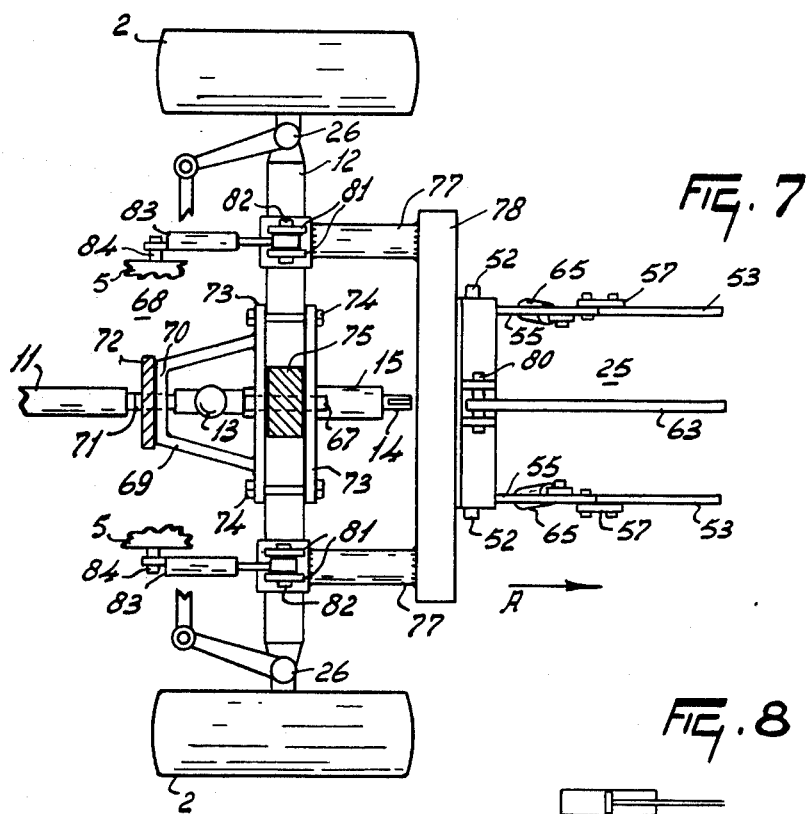
FIG. 7 is a plan view of the structure shown in FIG. 6.
Figure 8:
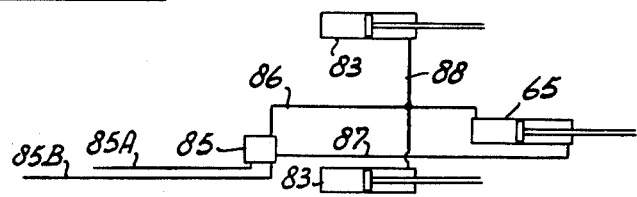
FIG. 8 is a diagram of the hydraulic system associated with FIGS. 6 and 7.

A second embodiment shown in FIGS. 6 to 8 has a front axle 12 which as in the first embodiment is freely pivotable about a horizontal pivotal shaft located in the tractor's longitudinal plane of symmetry and designated in FIGS. 6 and 7 by reference numeral 67. In standard type tractors, front axle 12 is supported in a horizontal direction by a supporting structure 68 which includes pivotal shaft 67. Supporting structure 68 usually comprises two rearwardly converging supporting walls 69 located in an opposed relationship with respect to the tractor's vertical, longitudinal plane of symmetry immediately to the rear and above the central part of front axle 12, the rear ends of walls 69 being connected by a connecting piece 70 which is pivotable by means of a pivotal shaft 71 with respect to a support 72 rigidly secured to the tractor frame. The center lines of pivotal shafts 67 and 71 are aligned with one another. The forward sides of supporting walls 69 are interconnected by means of a connecting plate 73, which is secured by bolts 74 to front axle 12 and comprises a bearing for pivotal shaft 67 which is secured by means of a support 75 to the tractor frame. At locations, viewed in plan, beyond engine casing 27 (if desired near pivotal shafts 26) clamping brackets 76, which are inverted U-shaped and clamped by bolts to the front axle 12, rigidly secure forwardly extending supports 77 at equal distances from pivotal shaft 67 to front axle 12.

Supports 77 are rigidly secured to one another at their ends remote from front axle 12 by means of a beam 78 formed by hollow beam of, for example, square cross-section. To the front side of beam 78 is welded a trestle 79 having the shape of an inverted U. To trestle 79 is fastened the further part of the lifting device, which is constructed in a manner similar to the first embodiment, the parts being designated by the same reference numerals. Top rod 63 is in this embodiment pivoted by means of a pivotal shaft 80 to the center of the connecting beam between the limbs of U-shaped trestle structure 79. At the connection of each support 77 to front axle 12, a pair of upstanding supports 81 spaced apart a small distance are rigidly secured to the associated support 77. Upstanding supports 81 extend, with lifting device 25 mounted as shown in FIGS. 6 and 7, upwardly from front axle 12 in a substantially vertical direction. Near the upper ends of a pair of supports 81, a pivotal shaft 82 is provided which receives and affords free pivotal movement for the forward end of a piston rod of a hydraulic cylinder 83. Cylinders 83, located like the pairs of supports 81, on either side of tractor frame 1, are pivotally connected with tractor frame 1 by means of pivotal shafts 84 extending horizontally and transversely of the direction of movement A. Pivotal shafts 84 are secured in place in bores for receiving same provided in the sides of the tractor frame. The hinge joints comprising shafts 84 may be ball-and-socket joints instead of pivotal shafts as shown.

FIG. 8 shows schematically the manner in which hydraulic lifting cylinders 65 of lifting device 25 are coupled with the hydraulic system including cylinders 83. A control-slide valve 85, with a pressurized line 85A and a return line 85B, provides hydraulic fluid under pressure via a line 86 to below the piston of cylinder 65, lifting device 25 then raising the coupled machine. Fluid above the piston in cylinder 65 communicated through a line 87 with control-slide valve 85. Both hydraulic cylinders 83 communicate with the space located above the piston in cylinder 65 via lines 86 and 88. In the space to the rear of the piston in the hydraulic cylinder 83, hydraulic fluid is not present and this space communicates with the atmosphere. Hydraulic cylinders 65 and 83 on the other side of the tractor frame are coupled in the same manner with control-slide valve 85, but the pairs of cylinders 65 may alternatively be coupled together via lines 86 and 87 at appropriate locations between control-slide valve 85 and cylinders 65.

The second embodiment operates as follows.

Lifting device 25 together with the associated frame having supports 77, beam 78 and the two pairs of supports 81 with the hydraulic cylinders 83 is coupled as a single unit with frame 1 by means of clamping brackets 76 and hinge joints 84. Also in this embodiment, lifting device 25 together with its frame moves freely as a unit with respect to tractor frame 1, so that the attached machine or tool performs the same movements as the front wheels 2 due to ground irregularities. In this embodiment, trestle 79 of the lifting device is rigidly secured in place with respect to front axle 12.

When lifting device 25 carries a machine, a torque is excerted by the two supports 77 on front axle 12 which might unduly stress pivotal shaft 67 and supporting structure 68 provided at the tractor factory. Inasmuch as these structural parts were not, in general, designed for such loads, the moment exerted by the attached machine is transmitted, in accordance with the invention, to the pairs of supports 81 and hydraulic cylinders 83 serving as compensation cylinders. The bending moment applied to supports 77 is received by the two supports 81, because the latter are rigidly secured to support 77. Bending moment in the support 77 thus is converted, via the supports 81, into a substantially horizontal, forwardly extending force that is absorbed by the compensation cylinders 83 and into a rearwardly directed force on support 72. Pivotal shaft 67 and supporting structure 68 are not, or are substantially not, loaded by moment from the lifting device 25. The pressurized fluid surface in hydraulic cylinder 83 is proportioned so that at a given fluid pressure, which is always the same for cylinders 65 and 83. (FIG. 8), hydraulic cylinder 83 exerts on the upper end of supports 81 such a force that, in view of the distance from pivotal shaft 82 to the center line of the front axle 12, it automatically compensates for the moment exerted by the weight of the attached tool on front axle 12 as the fluid pressure in cylinder 65 is always in conformity with the loading of the lifting device.

When the machine or tool is elevated, the space beneath the piston of cylinder 65 is exposed to a given fluid pressure, which propagates through lines 86 and 88 to the space forward of the piston of cylinder 83 so that the piston rod of said latter cylinder draws supports 81 to the rear, while as stated above the correct magnitude of the force in the piston rod of cylinder 83 for absorbin moment produced by the machine is obtained by proportioning the fluid pressure surface above piston in the cylinder 83. It is thus ensured that front axle 12 and pivotal shaft 67 therefor as well as supporting structure 68 are not overloaded by the moment produced by the weight of the machine. The same design may generally be used even if the precise supporting structure 68 is not provided. Moreover, the structures described above are not limited to use with a lifting device fastened to the front side or the front wheel axle of a tractor, but may also be adapted, for example, for a movable rear axle of a tractor and also on wheel axles rigidly secured to the tractor frame, if an additional releasable lifting device is desired.

Although I have described the preferred embodiments of my invention, it is to be understood that they are capable of other adaptations and modifications whereby structure recited in the claims should be construed to cover not only the corresponding structure described in the specification but also equivalents thereof.

Having thus described my invention, what I claim as new and desire to secure by Letters Patent of the United States is:

1. The combination of a tractor having a tractor frame with a lifting device, support means including support members interconnecting said frame and said lifting device, a first hydraulic cylinder and piston assembly extending between said frame and said support members, a second hydraulic cylinder and piston assembly in said lifting device for actuating said lifting device, conduit means hydraulically coupling said first and second hydraulic assemblies whereby actuation of hydraulic fluid pressure in said second assembly for lifting a load connected to said lifting device which applies a first moment of force on said support means automatically actuates hydraulic fluid pressure in said first hydraulic assembly to apply a second moment of force on said support member which substantially counteracts said first moment due to the lifting of said load being exerted on said support means.

2. A combination in accordance with claim 1 wherein said support means comprises an axle of said tractor connected to extend normally the tractor's longitudinal axis, said lifting device being rigidly connected to said axle, said axle being pivotally mounted relative to an axis parallel to said longitudinal axis with respect to said frame.

3. A combination in accordance with claim 2 wherein said support member is rigidly connected to said lifting device via said axle.

4. The combination of a vehicle having a frame and axle means, said axle means adapted to pivot relative to said frame about a horizontal axis parallel to the longitudinal axis of the vehicle, with a lifting device, supporting means for said lifting device rigidly connected to said axle means and extending normally therefrom whereby said lifting device pivots with said axle means, support members included in said supporting means, a first hydraulic cylinder and piston means interconnecting said lifting device through said supporting means and said support member with said frame, a second hydraulic cylinder and piston means in said lifting device for actuating said lifting device for lifting a load, the pistons of said first and second hydraulic cylinder and piston means having working areas which are substantially inversely proportional to their respective effective working distances from said axle means so as to provide substantially equal compensating moments relative to said axle means, conduit means between said first and second hydraulic cylinder and piston means for equalizing the fluid pressure in said first and second hydraulic cylinder and piston means and substantially effectively eliminating torque from said axle means exerted from said supporting means because of the lifting of said load by said lifting device.

5. A combination in accordance with claim 4, wherein said first hydraulic cylinder and piston means comprises two hydraulic cylinder and piston assemblies which are located on opposite sides of the longitudinal centerline of the vehicle.

6. A combination in accordance with claim 5, wherein said two hydraulic cylinder and piston assemblies are substantially horizontal and are connected to substantially vertical members extending included in said support members from said supporting means.

7. A combination in accordance with claim 6, wherein said vertical members extend upwardly above said axle means.

8. A combination in accordance with claim 7, wherein said supporting means comprises two horizontal members extending forwardly relative to said axle means.

9. A combination in accordance with claim 8, wherein each of said horizontal members and a corresponding said vertical member are in substantially the same vertical plane whereby there are two said vertical planes parallel to the longitudinal centerline of the vehicle each of which intersects a said vertical member and a corresponding said horizontal member.

10. A combination in accordance with claim 4, wherein said lifting device comprises a pair of lifting arms and said second hydraulic cylinder and piston means comprises a pair of hydraulic cylinder and piston assemblies, whereby one of said pair of hydraulic cylinder and piston assemblies is connected to each said lifting arm.

* * * * *